United States Patent
Gustafson et al.

[11] Patent Number: 5,997,284
[45] Date of Patent: Dec. 7, 1999

[54] PORTABLE FLARE TANK FOR DEGASSING OF DRILLING FLUID

[75] Inventors: Richard Brian Gustafson; Evert Todd Gustafson; Alfred James Gustafson; Paul Wierzba; Glen Darrell Worm, all of Calgary, Canada

[73] Assignee: Altex Oilfield Equipment, Ltd., Calgary, Canada

[21] Appl. No.: 09/068,403

[22] PCT Filed: Nov. 8, 1996

[86] PCT No.: PCT/CA96/00741

§ 371 Date: Aug. 21, 1998

§ 102(e) Date: Aug. 21, 1998

[87] PCT Pub. No.: WO97/17522

PCT Pub. Date: May 15, 1997

[51] Int. Cl.⁶ ............................................... B01D 19/00
[52] U.S. Cl. ......................................... 431/202; 95/262
[58] Field of Search .............................. 431/202; 95/262

[56] References Cited

U.S. PATENT DOCUMENTS

| | | |
|---|---|---|
| 2,243,176 | 5/1941 | Vander Henst . |
| 2,891,607 | 6/1959 | Webster et al. . |
| 3,501,255 | 3/1970 | Greene . |
| 3,633,687 | 1/1972 | West et al. . |
| 3,807,940 | 4/1974 | Juricek ..................................... 431/346 |
| 3,852,019 | 12/1974 | Stranahan et al. . |
| 4,009,985 | 3/1977 | Hirt . |
| 4,155,724 | 5/1979 | Burnham, Sr. . |
| 4,397,659 | 8/1983 | Gowan et al. . |
| 4,416,672 | 11/1983 | Underwood . |
| 4,789,170 | 12/1988 | Reber . |
| 4,900,244 | 2/1990 | Keller et al. ............................. 431/346 |
| 5,141,020 | 8/1992 | Sunderhaus et al. . |
| 5,211,554 | 5/1993 | Rajewski ................................. 431/346 |
| 5,380,195 | 1/1995 | Reid et al. . |
| 5,429,496 | 7/1995 | Stephens et al. . |
| 5,460,285 | 10/1995 | Harding, Sr. . |
| 5,507,858 | 4/1996 | Jepson . |
| 5,807,095 | 9/1998 | Gustafson et al. ...................... 431/202 |
| 5,882,187 | 3/1999 | Gustafson et al. ...................... 431/202 |

FOREIGN PATENT DOCUMENTS 0 211 492   2/1987   European Pat. Off. .

Primary Examiner—Carroll Dority
Attorney, Agent, or Firm—Burns, Doane, Swecker & Mathis, L.L.P.

[57] ABSTRACT

A flare tank (10) comprises a container (12) having a fluid inlet (14), a fluid outlet (16) and a fluid flow path between the inlet (14) and the outlet (16). A baffle plate (20) is provided in the container (12) between the inlet (14) and the outlet (16). The baffle plate (20) extends transversely relative to the flow path for forming at least a partial barrier to fluid flow in the flow path. A gas outlet, e.g., a chimney stack (18), is located on the container (12) for the discharge of gas separated from the fluid. A burner (46) is provided for the combustion of combustible gas passing through the outlet (18). A holding tank (201) may be provided for holding the fluid following passage through the flare tank. In addition, safety features (240, 244, 250, 206) can be provided to prevent or disable the explosion or rupture of the holding tank (201).

18 Claims, 6 Drawing Sheets

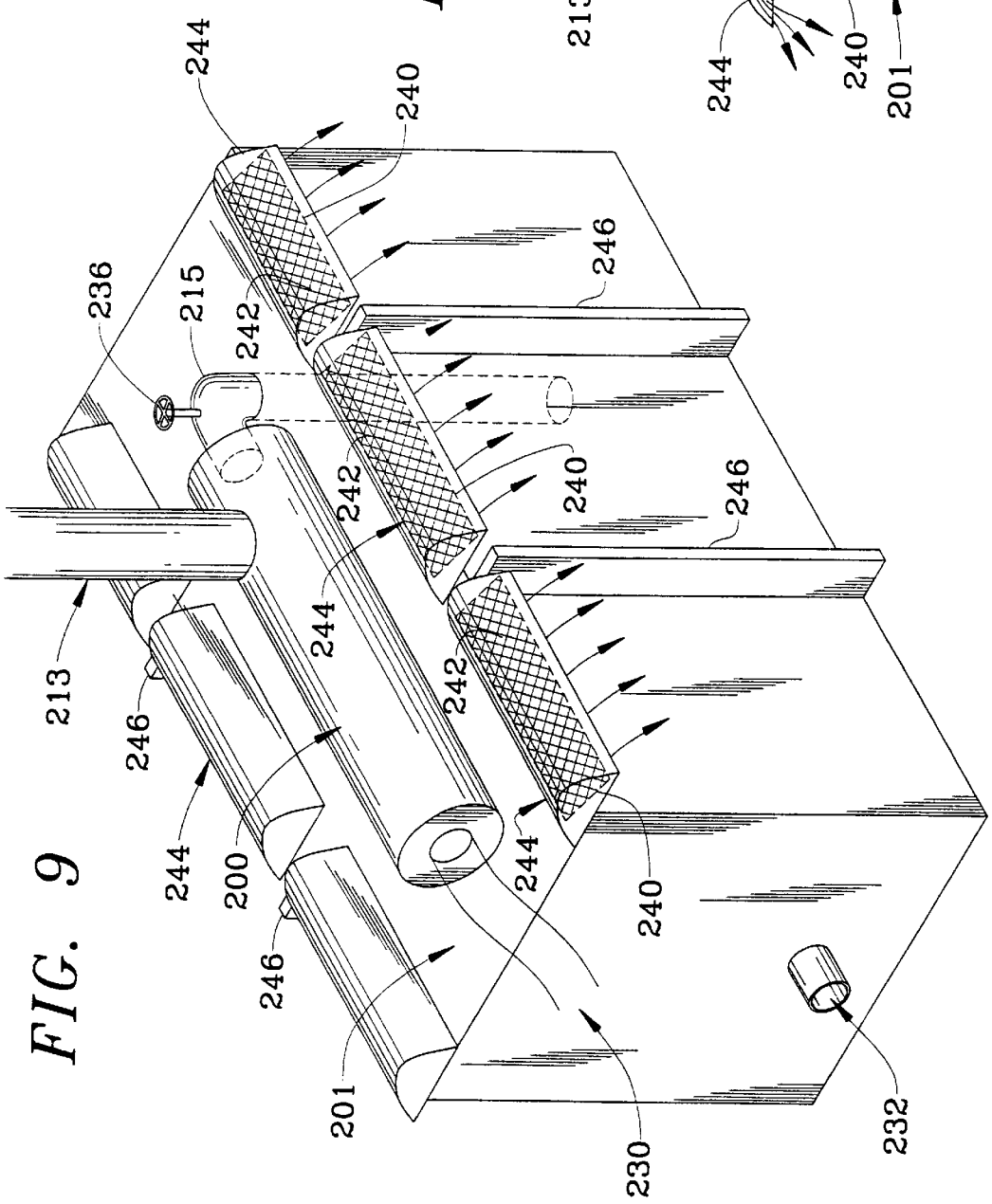

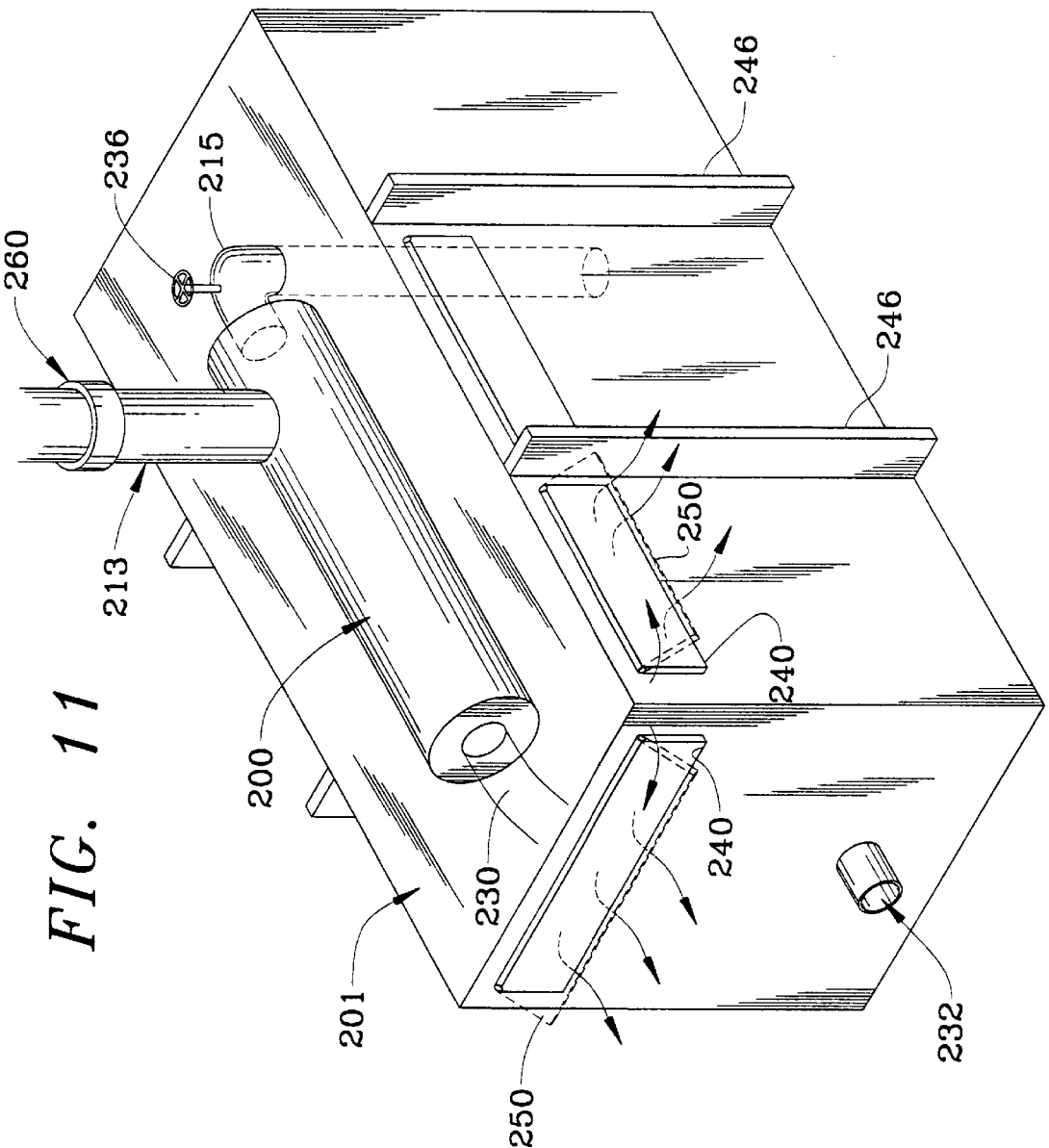

5,997,284

PORTABLE FLARE TANK FOR DEGASSING OF DRILLING FLUID

FIELD OF THE INVENTION

This invention relates to a flare tank and, more particularly, to a flare tank used for separating oil from fluid, specifically to separate combustible gases from mud which is produced during a drilling operation in the oil and gas industry.

BACKGROUND OF THE INVENTION

Flares are used in various applications for the disposal of waste gases through combustion. For example, when an oil well is tested, combustible gases may be burned off through the use of a flare tank or stack.

In previous operations, mud from the drill rig which contained combustible gases was piped to or disposed of in a flare pit adjacent to the drill rig. The flare pit is simply a hole dug in the ground which is used to hold the mud. However, the combustible gases can separate from the mud in the flare pit and accidentally ignite thereby causing emissions to the atmosphere which are environmentally unattractive and dangerous to closely located personnel both by way of danger to the person and also due to the possibility of starting a grass or brush fire. Likewise, the mud in the flare pit and the combustible gas can create ground contamination which is also of concern for environmental reasons. Finally, it is necessary to often haul away the mud within the flare pit due to the contamination by unburned gases. This is costly.

European Patent Application No. 211 492 discloses an apparatus for separating oil from produced water at a wellhead. The apparatus includes a separator that operates at elevated pressure to separate the wellhead product into a three components, one of which is a gas product. The apparatus is provided with a pipe for introducing the wellhead product into the separator and a baffle which forms a weir over which a substantial proportion of the oil in the wellhead product flows. The gas component is removed through a pipe for storage or supply to a pipeline or for burning off.

It is an object of the present invention to provide a flare tank which facilities separation of the combustible gases from the fluid being treated for gas disposal. It is a further object of the invention to provide a flare tank which is portable so as to minimize disturbances on work sites. It is a further object of the present invention to provide a flare tank which is safe and not susceptible to damages associated with an explosion in the flare tank.

SUMMARY OF THE INVENTION

According to the invention there is provided a flare tank comprising a container having a fluid inlet, a fluid outlet and a fluid flow path between said inlet and said outlet; a baffle plate in the container between said fluid inlet and said fluid outlet, said baffle plate projecting into said flow path of said fluid for forming at least a partial barrier to fluid flow in said path and a gas outlet on said container for the discharge of gas separated from said fluid in said container.

A burner is conveniently used to ignite the separated gas in order to burn it off following its separation from the fluid in the flare tank.

The baffle place may extend substantially transversely across the flow path, the baffle plate being provided with a recess at a lower end thereof for the flow of fluid therethrough.

The baffle plate may be provided with at least one opening above the recess for the passage of gas therethrough. Preferably, a plurality of openings is provided above the recess in the baffle plate.

The gas outlet in the container may comprise a chimney stack on the container. The chimney stack may be pivotally connected to the container for collapsing the chimney stack onto the container to facilitate transportation of the flare tank. The burner may be located at the top and of the chimney stack.

The container may be mounted on a pair of skids to facilitate movement of the flare tank into a desired location.

The flare tank may conveniently be mounted to a holding tank to facilitate the holding and disposal of the mud or fluid following the gas removal in the flare tank.

Further objects and advantages of the invention will become apparent from the detailed description of a preferred embodiment of the invention set forth below.

BRIEF DESCRIPTION OF THE SEVERAL VIEWS OF THE DRAWINGS

Specific embodiments of the invention will now be described, by way of example only, with the use of drawings in which:

FIG. 9 is a perspective view of a flare tank apparatus in accordance with another embodiment of the present invention in which a separator tank is mounted on a holding tank;

FIG. 10 is an end view of the flare tank apparatus shown in FIG. 9;

FIG. 11 is a perspective view of a flare tank apparatus in accordance with another embodiment of the present invention in which a separator tank is mounted on a holding tank;

DETAILED DESCRIPTION OF THE INVENTION

Figure 1:
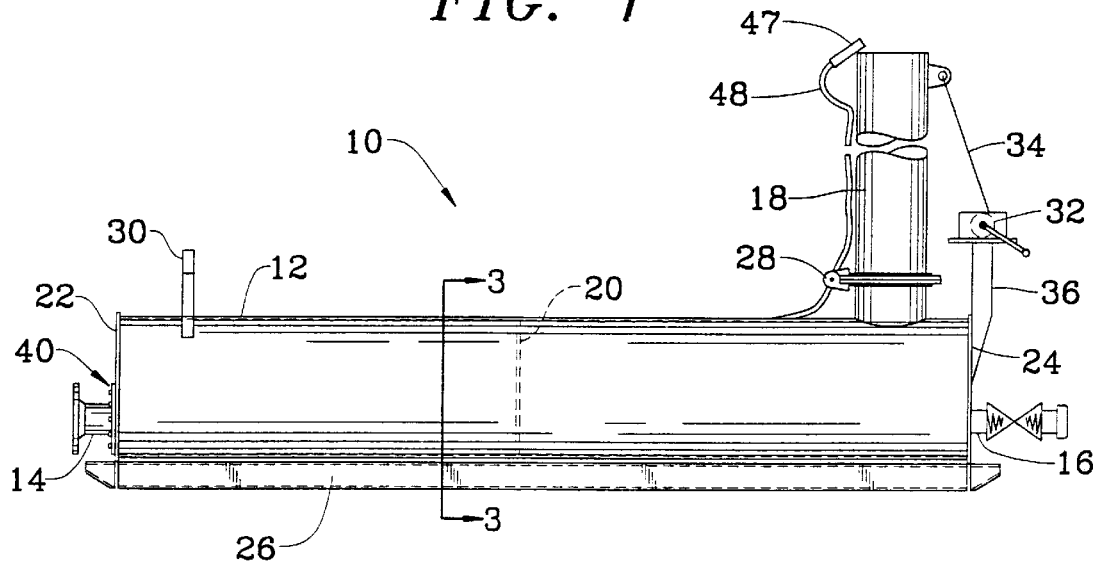
FIG. 1 is a side view of a portable flare tank according to the invention.
Figure 2:
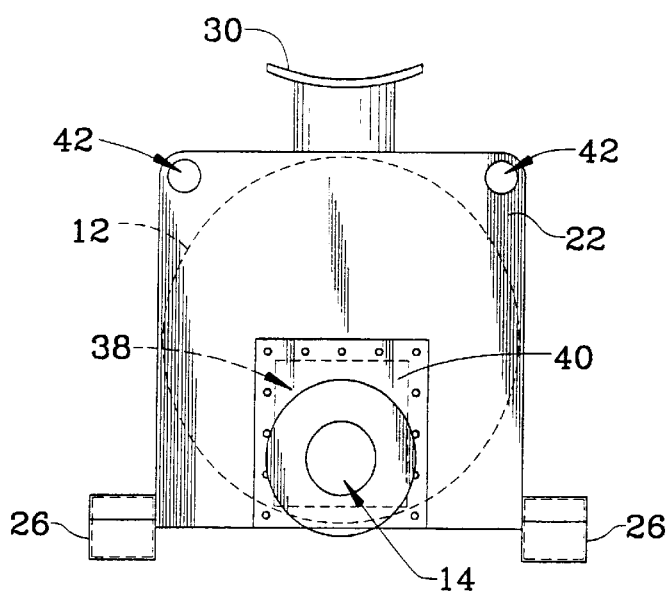
FIG. 2 is an end view of the flare tank of FIG. 1.

In the drawings reference numeral 10 generally indicates a flare tank comprising a cylindrical container 12 having an inlet 14 and an outlet 16, a chimney stack 18 located at the outlet end of the container 12, and a baffle plate 20 in the container 12.

The container 12 is conveniently in the form of a 50.8 cm (20 inch) diameter pipe and approximately 3.05 meters (10 feet) long. The container 12 is provided with end plates 22 and 24 at its inlet and outlet ends, respectively. A pair of skids 26 is attached between the plates 22 and 24 for supporting the flare tank 10 and to facilitate moving it into position along the ground.

The chimney stack 18 is connected through a pivotal connection 28 to the container 12 so that it can be collapsed into a generally horizontal position on the container 12 for transport purposes. The housing 12 is provided with a saddle 30 at its opposite end for supporting the free end of the chimney stack 18 when in the collapsed position. A winch 32 with a cable 34 is provided for raising and lowering the chimney stack 18. The winch 32 is attached to the end plate 24 by means of a pillar 36, which may be in the form of a length of square tubing.

The end plate 22 is provided with a cutout 38 which is covered by a removable cover plate 40 for inspection purposes. The plates 22, 24 are also provided with holes 42 for lifting purposes. The outlet 16 is provided with a threaded end for receiving a gate valve.

Figure 3:
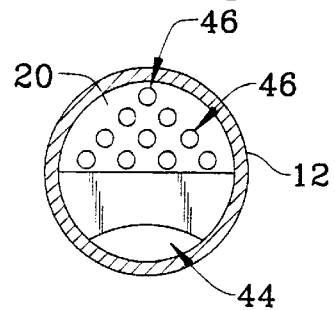
FIG. 3 is a cross section taken along the lines III—III in FIG. 1.

The baffle plate 20 is provided with a recess or somewhat semi-circular opening 44 at its lower end to allow for the passage of fluid therethrough. The baffle plate 20 is further provided with a plurality of holes 46 of about 3.75 cm (1¼ inch) diameter and spaced as shown in FIG. 3.

A gas burner 47, which is connectable through a hose 48 to a supply of combustible gas, such as gas in a pressurized cylinder (not shown), is provided. For convenience, a cage (now shown) for holding the gas cylinder can be attached to one side of the container 12.

In use, the flare tank 10 is transported to a desired site, e.g. where an oil well is being drilled. The mud or fluid from the well being drilled contains oil and gas. In order to burn off the gas, the fluid is diverted into the container 12 through the inlet 14, e.g., along a conduit, referred to as the "flare line", extending from the drill string into which the mud from the well is initially introduced.

As the fluid is flowed into the container 12, it impacts upon the baffle plate 20 which causes agitation of the fluid, resulting in separation of the gas, such as H2S, from the fluid. The gas escapes through the openings 46 and passes through the chimney stack 18 where the combustible gas is ignited and burned by the burner 47. The burner 47 is ignited prior to the gases passing through the chimney stack 18.

The flare tank 10 can be used in various different applications, e.g., where it is not desirable to dig a flare pit, such as for environmental considerations, or where it is not possible to dig a flare pit, such as with off shore drilling operations.

Figure 4:
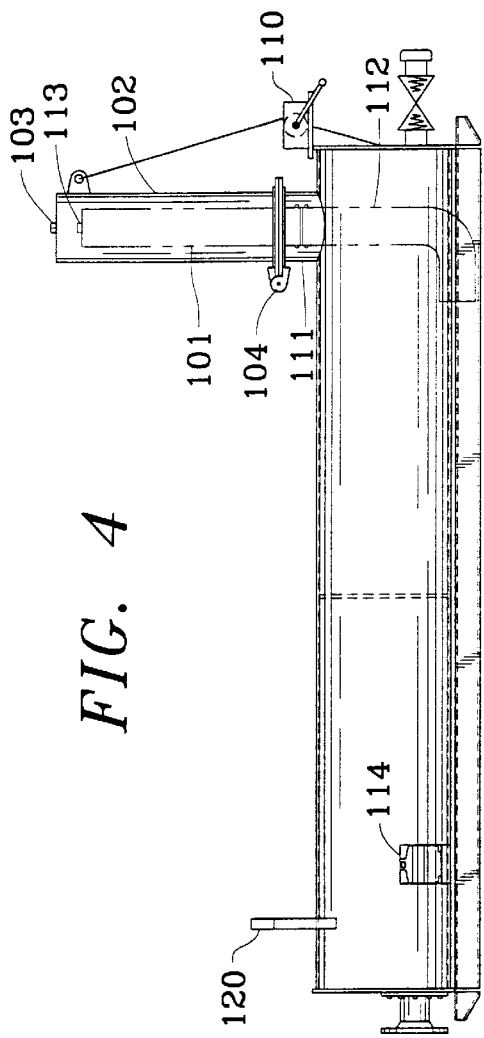
FIG. 4 is a side view similar to that of FIG. 1 but illustrating a second chimney stack.
Figure 5:
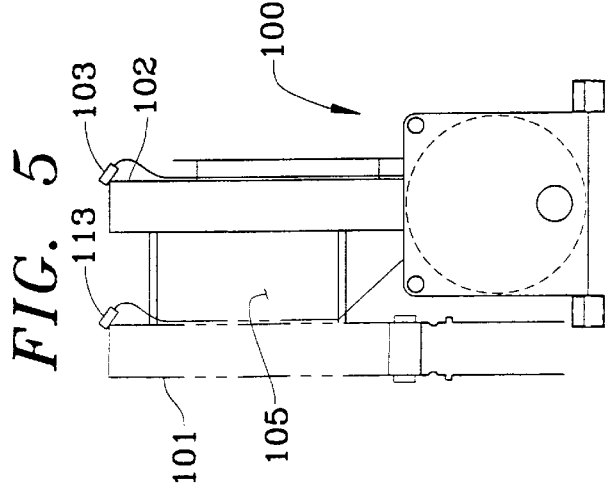
FIG. 5 is an end view of the apparatus illustrated in FIG. 4.

A further embodiment of the invention is illustrated in FIGS. 4 and 5. In this embodiment, the flare tank generally illustrated at 100 has a second chimney stack 101 connected thereto and additional to first chimney stack 102. Chimney stack 102 operates similarly to the chimney stack 18 of the FIG. 1 embodiment. That is, it has a pivoted connection (not shown) and an igniter 103 all as illustrated and described in accordance with the FIG. 1 embodiment.

The second chimney stack 101, however, is additional. It has a pivoted connection 104 and may be raised from the horizontal to the vertical position illustrated using a winch 110. The chimney stack 101 has a quick coupler 111 which allows the stack 101 to be connected directly to a pipe 112 which connects with the degasser line (not illustrated) extending from the mud tanks of the drill rig (not illustrated). Second chimney stack 101 has its own igniter 113 and each of the igniters 103,113 is connected to its own respective fuel source, conveniently a propane tank 114. A saddle 120 is provided for holding both of the chimney stacks 101, 102 in their horizontal or transport positions and a mounting bracket 105 is positioned between the two chimney stacks 101, 102 to securely hold the chimney stacks 101, 102 in position.

The operation of the flare tank 100 is similar to that described in connection with the embodiment of FIG. 1. The second chimney stack 101, however, is connected directly to the degasser line (not shown) extending from the mud tanks of the drill rig (not shown). Thus, no fluid enters second chimney stack 101 and no baffle plate is required, the gas being emitted from the chimney stack 101 as the igniter 113 ignites the gases travelling from the outlet of the chimney stack 101.

Figure 6:
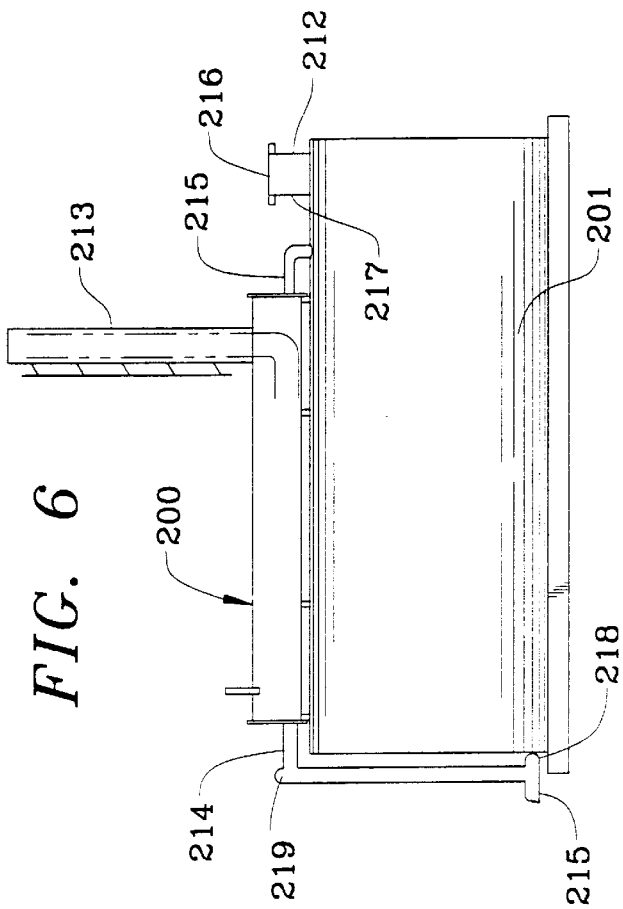
FIG. 6 is a side view of the flare tank according to the invention and mounted on a holding tank.
Figure 7:
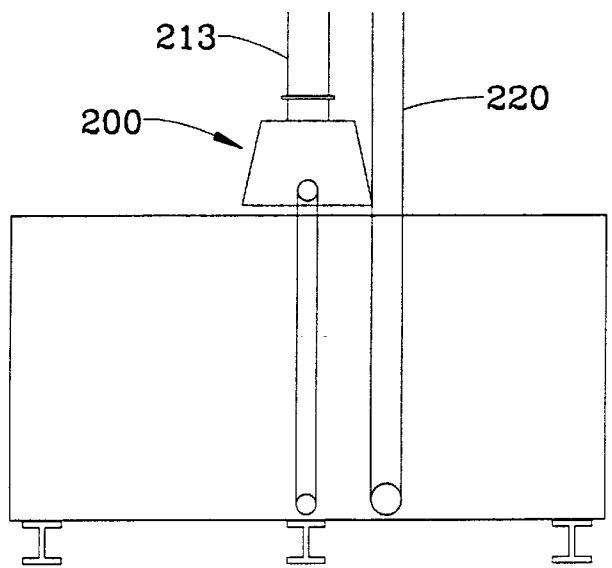
FIG. 7 is an end view of the apparatus illustrated in FIG. 6.
Figure 8:
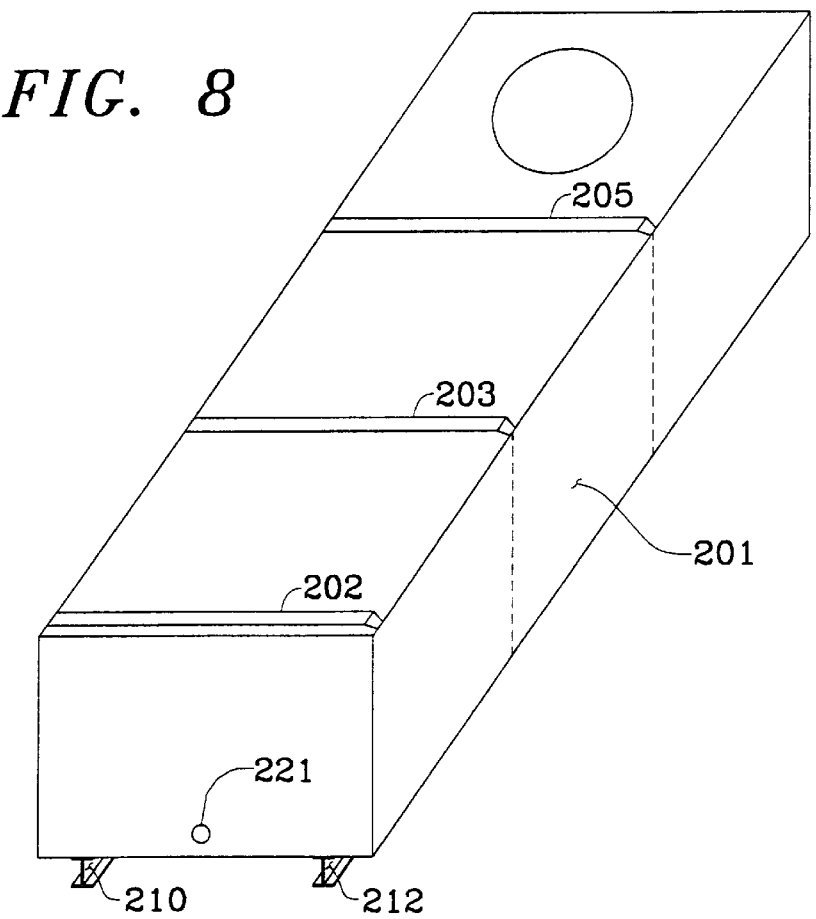
FIG. 8 illustrates the holding tank.

A further embodiment of the invention is illustrated in FIGS. 6 through 8. In this embodiment the flare tank or separator tank 200 is mounted on a holding or storage tank 201 (FIG. 6), conveniently a tank having a capacity of approximately 7950 liters (2100 gallons). The separator tank 200 sits on three channels 202, 203, 204 as best seen in FIG. 8, which channels are mounted to the top of the holding tank 201 as by welding. The holding tank 201 itself is mounted to I-beam skids 210, 211 which assists in the movement and placement of the apparatus.

The holding tank 201 has an explosion hatch vent 212 protruding vertically from one end of the holding tank 201. In the event of an explosion within the holding tank 201, the vent 212 will allow pressure dispersal without destroying the holding tank 201. The vent 212 has a cap 216 that is mounted above the entranceway pipe 217 and thereby provides venting to the tank 201.

A chimney stack 213 extends vertically from the separator tank 200 and operates identically to the chimney stack 102 of the FIG. 5 embodiment. That is, the gases separated from the fluid in the separator tank 200 will flow out the stack 213 and an igniter (not shown) is mounted on the end of the flare stack 213 to ignite the combustible gases.

In operation, the inlet line 214 will allow the flow of mud through the flare line 215 to the separator tank 200 from the drill string. Lead is provided in the flare line 215 and inlet line 214 at locations 218, 219. This allows the fluid to impact on the lead and rise upwardly therefrom rather than impacting on the elbows of the line and thereby wearing out the elbows prematurely. The fluid will enter the separator tank 200 and move therethrough contacting the baffle plate (not shown) mounted therein where separation of the gases from the fluid will occur in a way similar to the FIG. 5 embodiment. The gases will flow up the chimney stack 213 and will be ignited by the igniter where they will be burned off. The fluid or mud will move past the baffle plate to the outlet 215 (FIG. 6) of the separator tank 200 where the mud will then enter the holding tank 201 for future disposal of the now relatively benign fluid. Alternatively, the outlet 215 may flow into the hatch vent 212 through cap 216.

A second stack 220 (FIG. 7) may likewise be used in this embodiment. The second stack 220 is similar to stack 101 in the FIG. 5 embodiment. That is, the second stack 220 will be used with a quick connect coupler (not shown) which will take gas directly from the degasser line extending from the mud tanks of the drill rig and similarly burn the combustible gases by the use of an igniter.

The holding or storage tank 201 has a fitting 221 (FIG. 8) to allow emptying the holding tank 201 when desired by the operator.

FIGS. 9–13 illustrate several additional embodiments of a flare tank apparatus according to the present invention that are similar to the embodiment depicted in FIGS. 6–8 with the addition of safety features. As described above, the separator tank that is positioned on top of the holding tank receives a mixture of drilling mud and gas. The mixture is separated in the separator tank so that the gas travels up the flare stack and is burned while the remaining liquid or mud flows into the underlying holding or storage tank. The separator tank 200 includes a baffle similar to that illustrated in FIG. 3 for separating the gas from the remaining mud. As illustrated in FIG. 9, an inlet 230 is provided on the separator tank 200 through which drilling mud flows into the separator tank 200. The mud or liquid in the holding tank 201 is directed out of the storage tank by way of a drain pipe 232.

A torch 234 shown in FIG. 10, typically a propane torch, is used to start or ignite the gas in the flare stack. In addition, a valve 236 is typically provided on the connecting pipe 215 that extends from the outlet of the separator tank 200 into the storage tank 201.

When the operation of the apparatus is completed, the valve 236 in the connecting pipe 215 is typically closed to isolate the interior of the separator tank 201 from the flare stack 213. In addition, the torch 234 should be turned off. If these measures are not taken however, significant problems can arise. As the tank cools from an operating temperature that can be on the order of 121.1° C. (250° F.), air can become entrained in the holding tank 201 through the flare stack 213. Typically, the drilling mud in the holding tank 201 contains at least a small amount of gas and so over a period of time, a flammable and/or explosive mixture can be created in the holding tank 201 after completion of operation of the apparatus. This flammable and/or explosive mixture can diffuse upward through the flare stack 213 and become ignited from the pilot torch that is still on. The resulting flame can then travel down the flare stack 213 and into the interior of the holding tank 201 to thereby cause an explosion within the interior of the storage tank. In some situations, the force of the explosion can be quite significant, so much so that the holding tank becomes ruptured and the separator tank 200 is thrown from the holding tank 201.

The embodiments of the present invention illustrated in FIGS. 9–13 are designed to prevent or disable the explosion and rupture of the holding tank. In the embodiment illustrated in FIGS. 9 and 10, the upper corner along each of the two longitudinal sides of the storage tank 201 is provided with a series of openings 240. Each of the openings 240 spans the corner of the holding tank 201 and is formed by cutting out or removing a portion of the top wall and the side wall of the holding tank along opposite sides of the tank. The openings 204 are designed to provide ventilation and, in extremely rare occasions, to provide an exit for hot gasses should an ignition within the holding tank 201 occur. The openings provide sufficient draft to significantly reduce the possibility of ignition of the mixture in the holding tank 201. The size of the openings can be on the order of one-sixth of the height of the tank, although different tank geometries may require different size openings.

Wire meshes 242 span across the length of the openings 240 in the holding tank 201 to prevent objects from being thrown into the holding tank 201. The wire mesh is preferably selected to avoid significant interference with ventilating the holding tank interior. In addition, the wire meshes can help absorb initial shock from the flame front if an explosion should occur in the holding tank 201.

A deflection hood 244 is mounted at the top of the holding tank 201 and extends across the openings 240 at a location above the openings 240. The hoods 244 on opposite sides of the holding tank 201 are designed to deflect the flame that results should an ignition occur within the holding tank 201. The hoods 244 are somewhat curved and angularly oriented to deflect the flame downward at an angle of approximately 45°.

Another safety feature associated with the embodiment of present invention illustrated in FIGS. 9 and 10 involves the connecting pipe 215 that connects the separator 200 to the holding tank 201. By extending the connecting pipe 215 down into the holding tank 201 to a position almost at the bottom of the holding tank 201 (e.g., within 15.24 cm to 30.48 cm (6 in. to 12 in.) from the bottom), a small amount of liquid in the holding tank 201 will cause the open end of the pipe 215 to be submerged so that an effective flame barrier or arrestor is created.

As also illustrated in FIGS. 9 and 10, reinforcement ribs 246 are provided along the sides of the holding tank 201.

As an alternative to the wire mesh 242 that is stretched across the openings 240 in the apparatus illustrated in FIGS. 9 and 10, burst diaphragms can be provided in the openings. Such an arrangement would be advantageous in situations where, for example, the holding tank constitutes a closed system and no venting into the surrounding space is possible. Such a situation might arise in the context of an underground holding tank. Upon ignition of an explosive mixture in the holding tank, the diaphragms would burst and exhaust gasses would escape through the openings without causing an explosion or damage of the holding tank.

In the embodiment of the present invention illustrated in FIG. 11, spring loaded burst covers or pressure relief covers can be provided to cover the openings 240 in the holding tank 201. As shown in FIG. 11, an opening 240 with an appropriate cover can also be provided at the end of the tank in addition to the sides of the tank. The advantage of the spring loaded burst covers or pressure relief covers illustrated in FIG. 11 as compared to the use of burst diaphragms is that they remain intact and close automatically after detonation or ignition within the interior of the holding tank 201. The covers 250 would be designed to have a sufficiently fast response time and would be mounted at the top of the tank with sufficiently wide openings 240. Once again, the end of the connecting pipe 215 would be disposed almost to the bottom of the holding tank 201.

Figure 13:
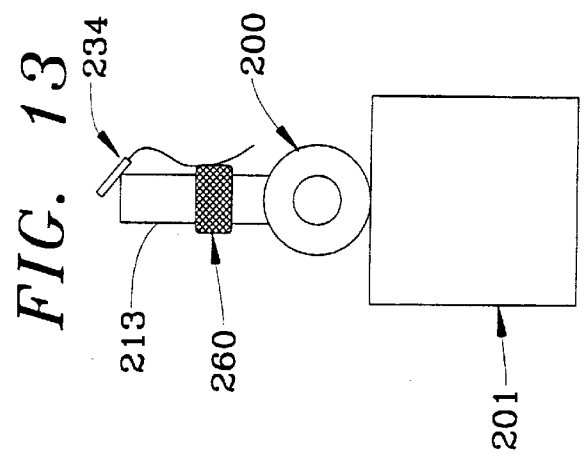
FIG. 13 is an end view of the flare tank apparatus shown in FIG. 12.
Figure 12:
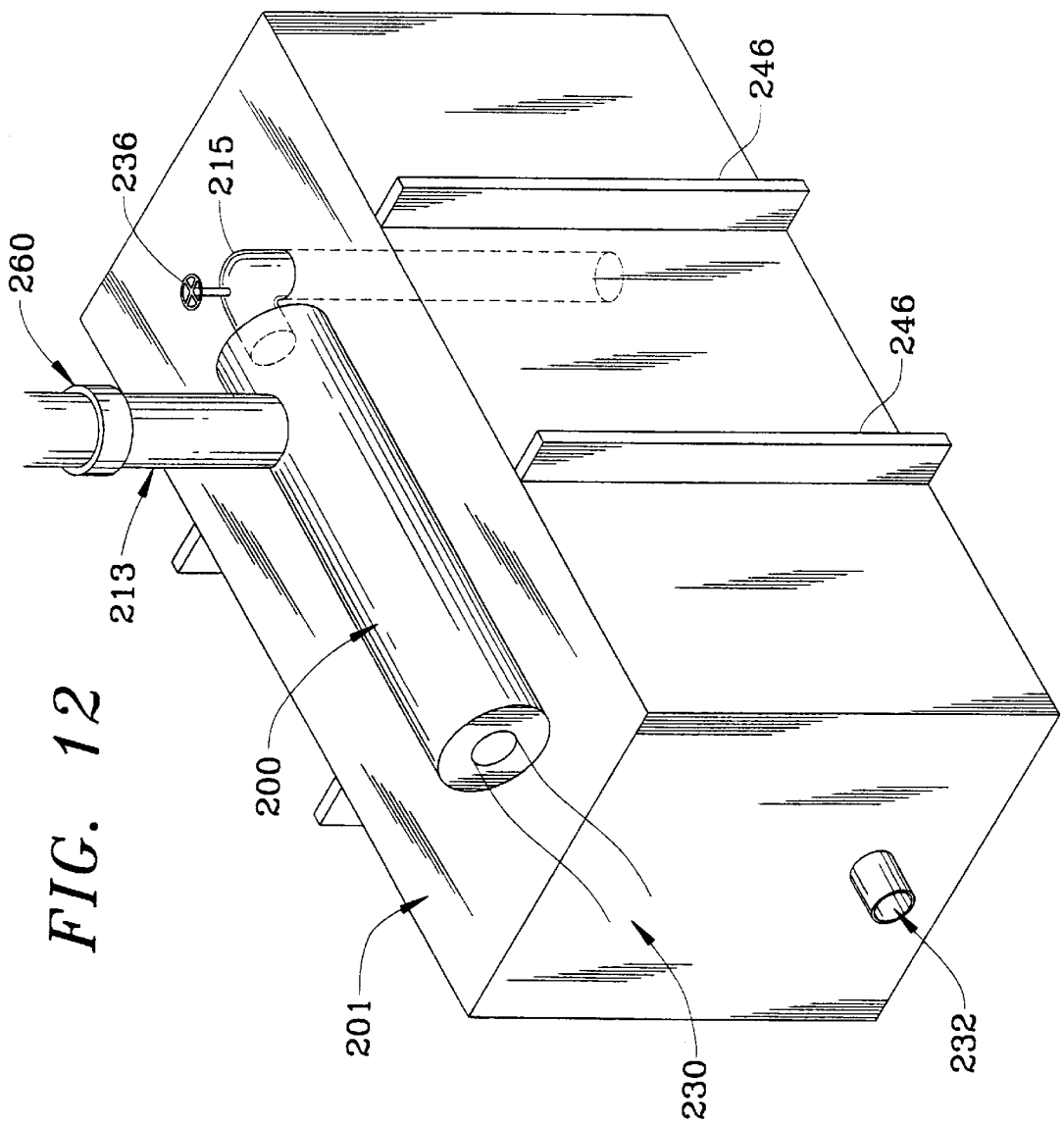
FIG. 12 is a perspective view of a flare tank apparatus in accordance with another embodiment of the present invention in which a separator tank is mounted on a holding tank.

A further embodiment of the present invention is illustrated in FIGS. 12 and 13. In this embodiment, a flame arrestor 260 is mounted on the flare stack 213. The flame arrestor 216 can be in the form of a wire screen providing a large surface area. The arrestor 216 can be positioned intermediate two pipe portions defining the flare stack 213. Such a flame arrestor 260 would prevent the flame initiated by the pilot torch from traveling down the flare stack and into the holding tank should a flammable mixture develop within the holding tank. It is to be understood that the flame arrestor 260 illustrated in FIGS. 12 and 13 could be used in conjunction with the apparatus illustrated in the various other embodiments of the present invention.

A further alternative safety feature that could be employed in connection with any of the embodiments of the present invention involves the use of a solenoid control to automatically close the valve 236 on the connecting pipe 215. The solenoid control could be activated by a flow sensor attached to the supply pipe 230. Once the flow sensor senses a no-flow condition, the sensor would automatically activate the solenoid control to close the valve 236 and shut off the pilot torch, thus preventing any possibility of explosion.

We claim:

1. A flare tank apparatus comprising:

a separator tank having an interior, a fluid inlet for introducing fluid containing combustible gas into the interior of the separator tank, a fluid outlet for discharging from the separator tank fluid from which the combustible gas has been at least partially removed, and a flow path extending between the fluid inlet and the fluid outlet; and a baffle plate disposed in the interior of the separator tank between the fluid inlet and the fluid outlet, the baffle plate projecting into said flow path to form at least a partial barrier to fluid flowing from the fluid inlet to the fluid outlet along the flow path; the baffle plate being designed to facilitate separation of the combustible gas from the fluid upon the fluid impacting the baffle plate, and in order to dispose of the combustible gas that has been separated from the fluid, a first flare stack provided on the separator tank in communication with the interior of the separator tank for discharging from the interior of the separator tank the combustible gas that has been separated from the fluid, a burner positioned adjacent an outlet of the first flare stack for igniting and burning combustible gas passing through the first flare stack, at least one opening provided in an upper portion of the holding tank along one side of the holding tank, and a deflector head mounted on the holding tank above the opening to downwardly deflect flame resulting from ignition of a gas mixture in the holding tank.

2. The flare tank apparatus according to claim 1, wherein said baffle plate extends substantially perpendicularly across said flow path and extends across the entire interior diameter of the separator tank.

3. The flare tank apparatus according to claim 2, wherein said baffle plate includes a lower portion provided with a recess for the flow of said fluid therethrough.

4. The flare tank apparatus according to claim 3, wherein said baffle plate is provided with a plurality of openings above said recess for the passage of gas therethrough.

5. The flare tank apparatus according to claim 1, wherein said first flare stack is pivotally connected to said separator tank for collapsing the first flare stack into a horizontal position onto said separator tank to facilitate transportation of the flare tank.

6. The flare tank apparatus according to claim 1, wherein said separator tank is mounted on skids to facilitate movement of the flare tank into a desired location.

7. The flare tank apparatus according to claim 1, and further comprising a second flare stack for the combustion of gases from a well and a second burner to ignite and burn gas passing through said second flare stack.

8. The flare tank apparatus according to claim 1, wherein said holding tank further comprises an explosion hatch and vent mounted therein.

9. The flare tank apparatus according to claim 1, including an arrestor provided in the first flare stack to inhibit flame from travelling down the first flare stack.

10. A flare tank apparatus comprising:

a separator tank having an interior, a fluid inlet for introducing fluid containing combustible gas into the interior of the separator tank, a fluid outlet for discharging from the separator tank fluid from which the combustible gas has been at least partially removed, and a flow path extending between the fluid inlet and the fluid outlet; and a baffle plate disposed in the interior of the separator tank between the fluid inlet and the fluid outlet, the baffle plate projecting into said flow path to form at least a partial barrier to fluid flowing from the fluid inlet to the fluid outlet along the flow path, the baffle plate being designed to facilitate separation of the combustible gas from the fluid upon the fluid impacting the baffle plate, and in order to dispose of the combustible gas that has been separated from the fluid, a first flare stack is provided on the separator tank in communication with the interior of the separator tank for discharging from the interior of the separator tank the combustible gas that has been separated from the fluid, a burner positioned adjacent an outlet of the first flare stack for igniting and burning combustible gas passing through the first flare stack, at least one opening provided in an upper portion of the holding tank along one side of the holding tank, and a spring biased pressure relief cover mounted on the holding tank to cover the opening.

11. The flare tank apparatus according to claim 10, wherein said baffle plate extends substantially perpendicularly across said flow path and extends across the entire interior diameter of the separator tank.

12. The flare tank apparatus according to claim 11, wherein said baffle plate includes a lower portion provided with a recess for the flow of said fluid therethrough.

13. The flare tank apparatus according to claim 11, wherein said baffle plate is provided with a plurality of openings above said recess for the passage of gas therethrough.

14. The flare tank apparatus according to claim 10, wherein said first flare stack is pivotally connected to said separator tank for collapsing the first flare stack into a horizontal position onto said separator tank to facilitate transportation of the flare tank.

15. The flare tank apparatus according to claim 10, wherein said separator tank is mounted on skids to facilitate movement of the flare tank into a desired location.

16. The flare tank apparatus according to claim 10, and further comprising a second flare stack for the combustion of gases from a well and a second burner to ignite and burn gas passing through said second flare stack.

17. The flare tank apparatus according to claim 10, wherein said holding tank further comprises an explosion hatch and vent mounted therein.

18. The flare tank apparatus according to claim 10, including an arrestor provided in the first flare stack to inhibit flame from traveling down the first flare stack.

* * * * *